Aug. 5, 1924.
O. H. HOVDA
1,503,831
DRAFT DEVICE
Filed Sept. 14, 1922
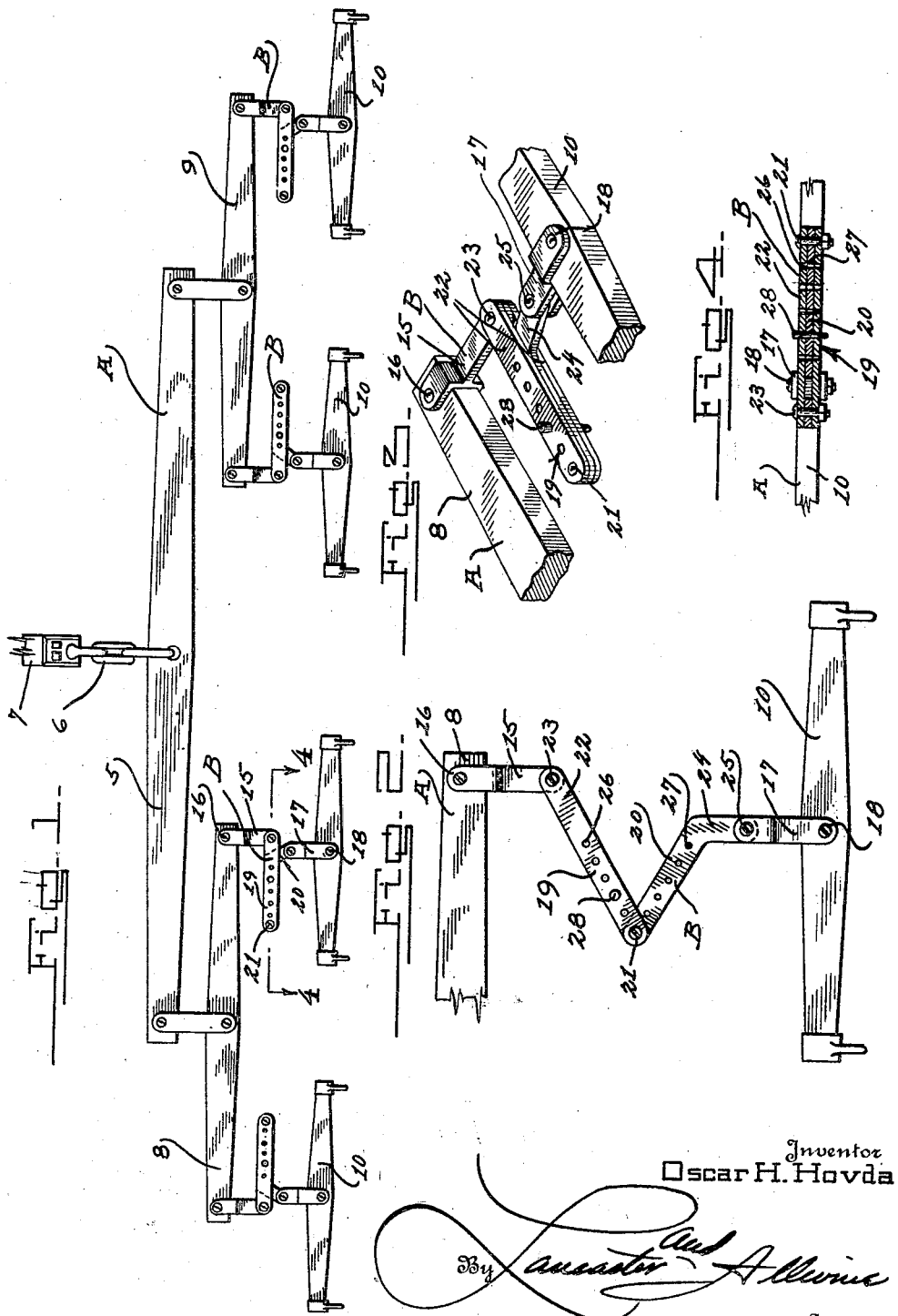
Inventor
Oscar H. Hovda
By Lancaster and Allwine
Attorneys Patented Aug. 5, 1924.

1,503,831

UNITED STATES PATENT OFFICE.

OSCAR H. HOVDA, OF GRAND MEADOW, MINNESOTA.

DRAFT DEVICE.

Application filed September 14, 1922. Serial No. 588,261.

*To all whom it may concern:*

Be it known that I, OSCAR H. HOVDA, a citizen of the United States, residing at Grand Meadow, in the county of Mower and State of Minnesota, have invented certain new and useful Improvements in Draft Devices, of which the following is a specification.

This invention relates to draft devices of the type which are employed in connection with plows, lifters and other agricultural implements, and the primary object of the invention is to provide a novel draft device in which means is incorporated therein for effectively preventing injury to the draft device or the machine being drawn when the said machine strikes an obstruction such as a rock or the stump of a tree.

Another object of the invention is to provide an improved draft device in which the single trees are connected to the double trees or other parts of the draft device in a novel manner, said connecting means embodying a pair of pivotally connected levers which have their free ends connected respectively to the double and single trees, the levers being normally held against swinging movement by the use of frangible pins, which are adapted to shear when the plow or other agricultural implement strikes an obstruction, the shearing of the pin permitting the swinging of the levers allowing the draft animals to travel forward a sufficient distance to enable the driver to properly control them and to bring them to a standstill before a sufficient strain can be placed upon the draft device and agricultural implement which would be liable to do serious damage thereto.

A further object of the invention is to provide a novel means for changing the position of the frangible pin in relation to the swinging levers, so that the said connecting means can be regulated for heavy or light draft.

A further object of the invention is to provide an improved draft device of the above character which is of exceptionally simple and durable construction, one that is exceedingly light in weight, one that can be placed upon the market at a reasonable cost, and one which will permit the easy drawing of the agricultural implements by the draft animals.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a plan view of a four horse evener showing the application of the invention thereto.

Figure 2 is an enlarged detail fragmentary view, illustrating the position of a single tree to the double tree or draft beam when the agricultural implement has met with an obstruction and the frangible pin has been sheared.

Figure 3 is a perspective view of the improved connection, showing the same connecting a single and double tree, the single or double tree being broken away, the connecting device being shown in its normal position.

Figure 4 is a longitudinal section through the improved connecting means taken on the line 4—4 of Figure 1.

Referring to the drawings in detail, wherein similar reference characters designate corresponding parts throughout the several views, the letter A generally indicates a draft device; and B, the improved invention which is incorporated with said draft device.

The draft device A may be of any preferred type or size and for the purpose of illustration the same has been shown to be of the four horse evener type and includes the draw beam 5, which is connected at a point intermediate its ends by a suitable clevis and link means 6 with a beam or tongue 7 of a plow or other agricultural machine (not shown). The opposite terminals of the draw beam 5 can have connected thereto in the usual manner double trees 8 and 9.

The terminals of the double trees 8 and 9 are connected by the improved connecting devices B with single trees 10. The single trees 10 are of course connected with the harness traces of the draft animals in the ordinary manner.

In view of the fact that all of the improved connecting means B for the single trees 10 are constructed the same, merely one of the connecting means will be described in detail.

Each of these connecting means B includes an outwardly extending arm 15, which can be pivotally secured as at 16 to a double tree terminal. A similar arm 17 can be pivoted at 18 to a single tree intermediate the ends thereof.

These arms 15 and 17 are connected by a pair of swinging lever members 19 and 20 which are pivotally connected together at their inner ends by a suitable pivot pin or the like 21.

The lever 19 consists of a pair of spaced straps 22 between which the arm 15 extends and this arm 15 is pivotally connected to the straps 22 by means of a suitable pivot pin 23. The lever 20 is adapted to lie intermediate the straps as clearly shown in Figures 3 and 4 of the drawings. These levers 19 and 20 normally lie in parallel relation to each other and to the double and single trees, but when the plow or other agricultural implement meets with an obstruction, the same are adapted to swing outwardly to a position shown in Figure 2 of the drawings. The outer end of the lever 20 is provided with a right angularly extending leg 24 which is connected by means of a suitable pivot pin 25 to the arm 17.

The strap members 22 of the lever 19 and the body portion of the lever 20 are provided respectively with a plurality of aligned openings 26 and 27 and any of the aligned openings are adapted to receive a frangible pin 28 which can be formed of wood or the like. These openings 26 and 27 are adapted to register with one another when the levers 19 and 20 are in their normal position, and it is obvious that when undue strain is placed upon the draft appliance, the pin 28 will break, thus allowing the swinging movement of the levers 19 and 20 which will permit the driver to control the horses and bring them to a standstill before sudden strain can be imposed upon the draft device or agricultural implement, which would be liable to injure the same. It is obvious that further the pin 28 is placed away from the pivot pin 21, the greater draft the same can withstand, and thus this pin 28 may be adjusted toward and away from the pivot pin 21 according to the draft to be sustained.

From the foregoing description, it can be seen that an exceptionally simple safety attachment has been made for draft appliance which will effectively eliminate injury to the draft appliance and to the agricultural implement connected therewith when undue strain is placed upon the agricultural implement through any cause.

Changes in details may be made without departing from the spirit or scope of this invention; but,

I claim:

1. In a draft appliance, a means for connecting parts of the appliance together including a pair of levers, means pivotally connecting the levers together at one end, said levers being normally positioned longitudinally of each other with one extending beneath the other and one having its free end portion extending to one side to project beyond the side of the other lever when the levers are in the normal position, means pivotally connected with the free ends of said levers for connecting the levers with the parts of the draft appliance, said levers having openings for ringistering when the levers are in a normal position, and a fragile pin adapted to be passed through aligned openings in the levers to releasably retain the levers in the normal position.

2. A draft appliance comprising a double tree, single trees, and means connecting the single trees intermediate their ends to the terminals of the double tree including a pair of levers pivotally connected together at one of their ends, means connecting the opposite end of one of said members to the double trees for swinging movement, an angularly extending arm formed on the free terminal of the other lever, means pivotally connecting the angularly extending terminal of the last mentioned lever to the single tree, the levers having a plurality of spaced openings formed therein adapted to align when the levers are in their normal position, the openings extending from the pivot point of the levers toward their outer ends, and a frangible pin adapted to be placed in any one of said registering openings.

OSCAR H. HOVDA.